(12) United States Patent
Usukura

(10) Patent No.: US 7,532,580 B2
(45) Date of Patent: May 12, 2009

(54) GATEWAY APPARATUS, COMMUNICATION SYSTEM, AND DELAY MEASUREMENT METHOD

(75) Inventor: Takashi Usukura, Tokyo (JP)

(73) Assignee: NEC Corporation, Tokyo (JP)

( * ) Notice: Subject to any disclaimer, the term of this patent is extended or adjusted under 35 U.S.C. 154(b) by 631 days.

(21) Appl. No.: 11/225,711

(22) Filed: Sep. 13, 2005

(65) Prior Publication Data

US 2006/0056429 A1 Mar. 16, 2006

(30) Foreign Application Priority Data

Sep. 15, 2004 (JP) ............................. 2004-267652

(51) Int. Cl.
*H04L 12/26* (2006.01)
*H04L 12/28* (2006.01)

(52) U.S. Cl. ...................................... 370/252; 370/401
(58) Field of Classification Search .................. None
See application file for complete search history.

(56) References Cited

U.S. PATENT DOCUMENTS

| 7,006,448 | B1 * | 2/2006 | Thio ........................... 370/252 |
| 7,289,454 | B2 * | 10/2007 | Bovo et al. ................... 370/252 |
| 2005/0220028 | A1 * | 10/2005 | Botkin et al. ................ 370/241 |
| 2005/0254508 | A1 * | 11/2005 | Aksu et al. ................... 370/428 |

FOREIGN PATENT DOCUMENTS

| JP | 2001-333092 | 11/2001 |
| JP | 2003-244237 | 8/2003 |

OTHER PUBLICATIONS

"RTP: A Transport Protocol for Real-Time Applications, 6.4 Sender and Receiver Reports" (RFC3550, Jul. 2003, pp. 35-45).

\* cited by examiner

*Primary Examiner*—Wing F Chan
*Assistant Examiner*—Marcus R Smith
(74) *Attorney, Agent, or Firm*—Scully, Scott, Murphy & Presser, P.C.

(57) ABSTRACT

A gateway apparatus includes a packet transmitting unit, duplicate packet detecting unit, and time measuring unit. The packet transmitting unit transmits to a counter apparatus the first packet that coincides with a packet transmitted immediately before reception of a delay measurement instruction for an IP (Internet Protocol) network between the gateway apparatus and the counter apparatus connected via the IP network. The duplicate packet detecting unit detects the second packet that is transmitted from the counter apparatus in response to reception of the first packet and coincides with a packet transmitted immediately before reception of the first packet. The time measuring unit measures the time until the duplicate packet detecting unit detects the second packet after the packet transmitting unit transmits the first packet. A communication system, delay measurement method, and recording medium are also disclosed.

21 Claims, 8 Drawing Sheets

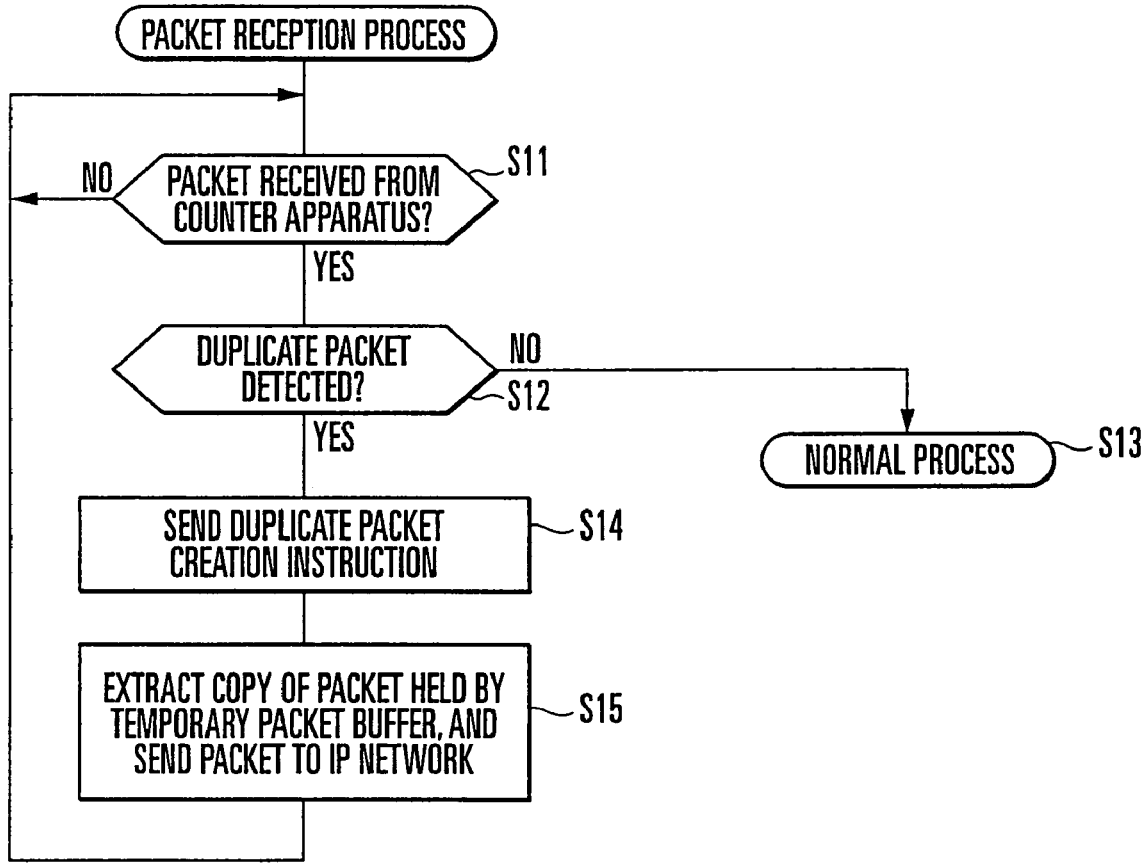
F I G. 8

GATEWAY APPARATUS, COMMUNICATION SYSTEM, AND DELAY MEASUREMENT METHOD

BACKGROUND OF THE INVENTION

The present invention relates to a gateway apparatus, communication system, and delay measurement method and, more particularly, to a gateway apparatus, communication system, and delay measurement method which measure the delay of an IP (Internet Protocol) network.

As a delay measurement method of this type, there has conventionally been proposed measurement by, e.g., a method of generating a special packet for measurement (see, e.g., reference 1 (Japanese Patent Laid-Open No. 2003-244237)), or a method of padding time information in a packet itself (see, e.g., reference 2 (Japanese Patent Laid-Open No. 2001-333092)).

These methods do not use a standard packet defined in the RFC (Request For Comments) of IETF (the Internet Engineering Task Force). In a today's IP network in which network address translation, a packet filter, and priority control are generalized, measurement is not performed under the same conditions as those for an RTP (Real-time Transport Protocol) stream to be measured.

In round-trip measurement using RTCP (RTP Control Protocol) described in RFC3550 (see, e.g., reference 3 ("RTP: A Transport Protocol for Real-Time Applications, 6.4 Sender and Receiver Reports" (RFC3550, July 2003, Pages 35-45)), (1) RTCP must be implemented, (2) RTCP is not always treated similarly to RTP on an IP network, and (3) the cycle of round-trip measurement coincides with the process cycle of another RTCP element. Round-trip measurement is to measure a round-trip time until a packet originated from a given terminal arrives at another terminal and a response to the packet is sent back.

Conventionally, to measure the round-trip time in the IP network, special packets which contain measurement data, such as RTCP and ICMP (Internet Control Message Protocol), must be generated.

However, a conventional delay measurement method suffers the following problems. (1) A dedicated addition processing block is necessary to generate a special packet. (2) When a special packet is sent to an apparatus which does not support it, the load of a reception process by the incompatible apparatus increases. (3) A special packet cannot pass depending on the settings of the NAT (Network Address Translation), firewall, or router, or may be processed differently from an RTP stream to be measured because priority is given to different traffics.

SUMMARY OF THE INVENTION

The present invention has been made to overcome the conventional drawbacks, and has as its object to make it possible to measure a delay in an IP network without using any special packet for measurement.

To achieve the above object, according to the present invention, a gateway apparatus comprises a packet transmitting unit which transmits to a counter apparatus a first packet that coincides with a packet transmitted immediately before reception of a delay measurement instruction for an IP (Internet Protocol) network between the gateway apparatus and the counter apparatus connected via the IP network, a duplicate packet detecting unit which detects a second packet that is transmitted from the counter apparatus in response to reception of the first packet and coincides with a packet transmitted immediately before reception of the first packet, and a time measuring unit which measures a time until the duplicate packet detecting unit detects the second packet after the packet transmitting unit transmits the first packet.

A communication system comprises a first gateway apparatus and a second gateway apparatus which are connected to each other via an IP (Internet Protocol) network, the first gateway apparatus comprising a first packet transmitting unit which transmits to the second gateway apparatus a first packet that coincides with a packet transmitted immediately before reception of a delay measurement instruction for the IP network between the first gateway apparatus and the second gateway apparatus, a first duplicate packet detecting unit which detects a second packet that is transmitted from the second gateway apparatus in response to reception of the first packet and coincides with a packet transmitted immediately before reception of the first packet, and a time measuring unit which measures a time until the first duplicate packet detecting unit detects the second packet after the first packet transmitting unit transmits the first packet.

A delay measurement method comprises the steps of causing a first gateway apparatus to transmit to a second gateway apparatus a first packet that coincides with a packet transmitted immediately before reception of a delay measurement instruction for an IP (Internet Protocol) network between the first gateway apparatus and the second gateway apparatus, causing the second gateway apparatus to detect a first packet from the first gateway apparatus, causing the second gateway apparatus to transmit to the first gateway apparatus a second packet that coincides with a packet transmitted immediately before the first packet is detected, causing the first gateway apparatus to detect the second packet from the second gateway apparatus, and causing the first gateway apparatus to measure a time until the second packet is detected after the first packet is transmitted.

BRIEF DESCRIPTION OF THE DRAWINGS

FIG. 8 is a flowchart showing operation of the second gateway apparatus; and

DESCRIPTION OF THE PREFERRED EMBODIMENT

A preferred embodiment of the present invention will be described in detail below with reference to the accompanying drawings.

Figure 1:
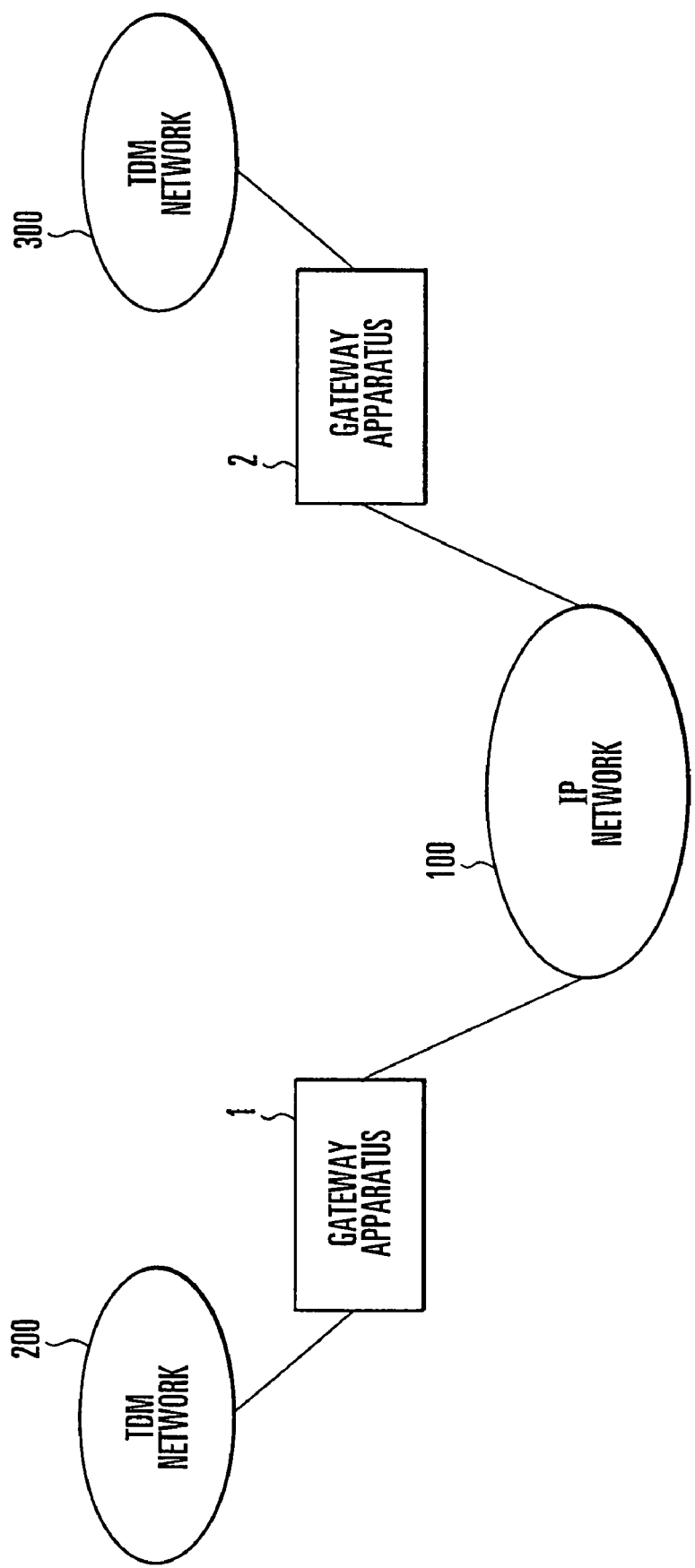
FIG. 1 is a block diagram showing the configuration of a communication system according to an embodiment of the present invention.

In a communication system according to the embodiment of the present invention, as shown in FIG. 1, first and second gateway apparatuses 1 and 2 are connected to an IP network 100. The gateway apparatuses 1 and 2 are respectively connected to TDM (Time Division Multiplexing) networks 200 and 300, and perform media conversion between the IP network 100 and the networks 200 and 300.

The configurations of the gateway apparatuses 1 and 2 will be further explained with reference to FIGS. 2 to 5.

Figure 2:
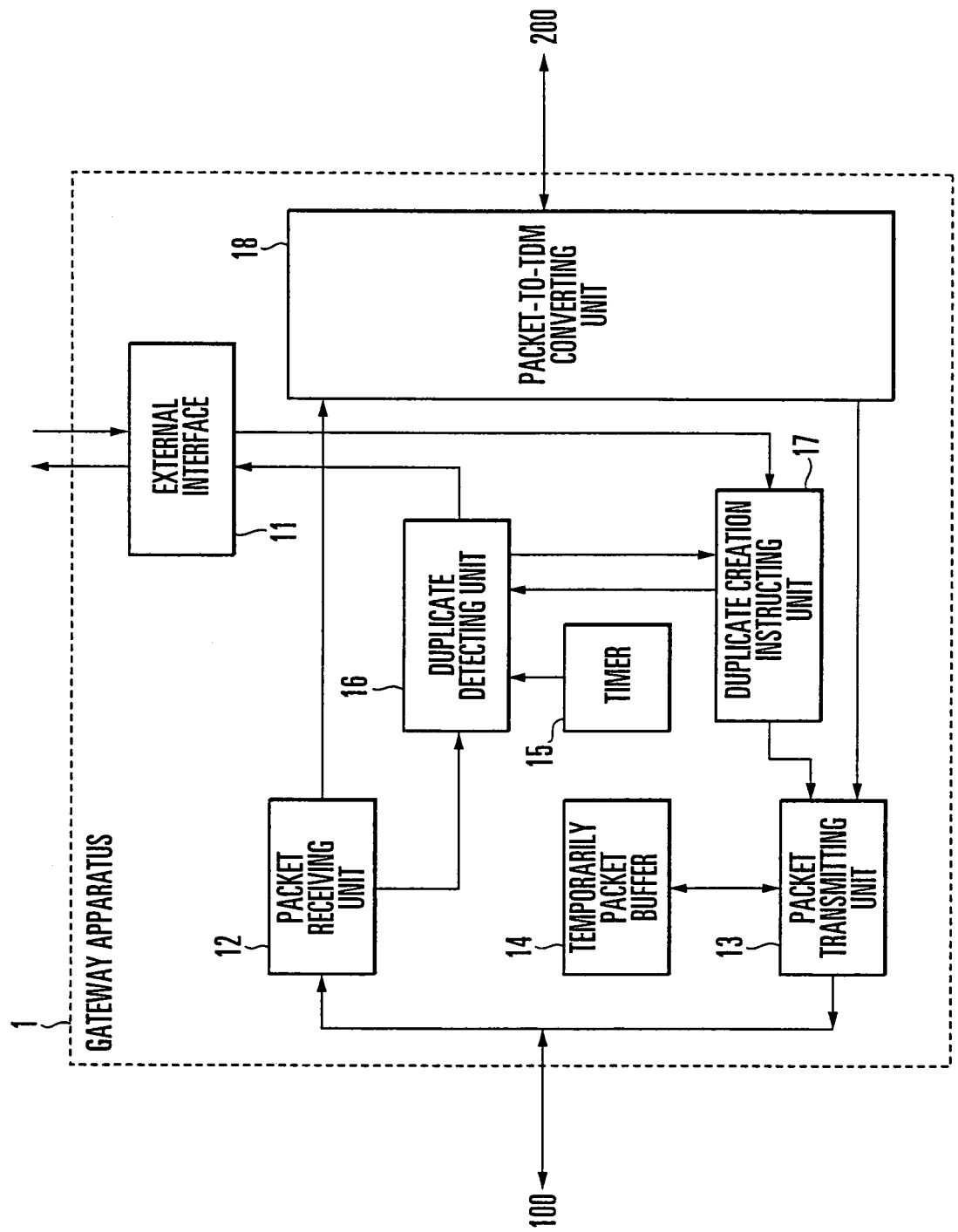
FIG. 2 is a block diagram showing an example of the configuration of the first gateway apparatus.

As shown in FIG. 2, the gateway apparatus 1 comprises a first external interface 11, first packet receiving unit 12, first packet transmitting unit 13, first temporarily packet buffer (first packet holding unit) 14, first timer 15, first duplicate detecting unit 16, first duplicate creation instructing unit 17, and first packet-to-TDM converting unit 18.

Figure 3:
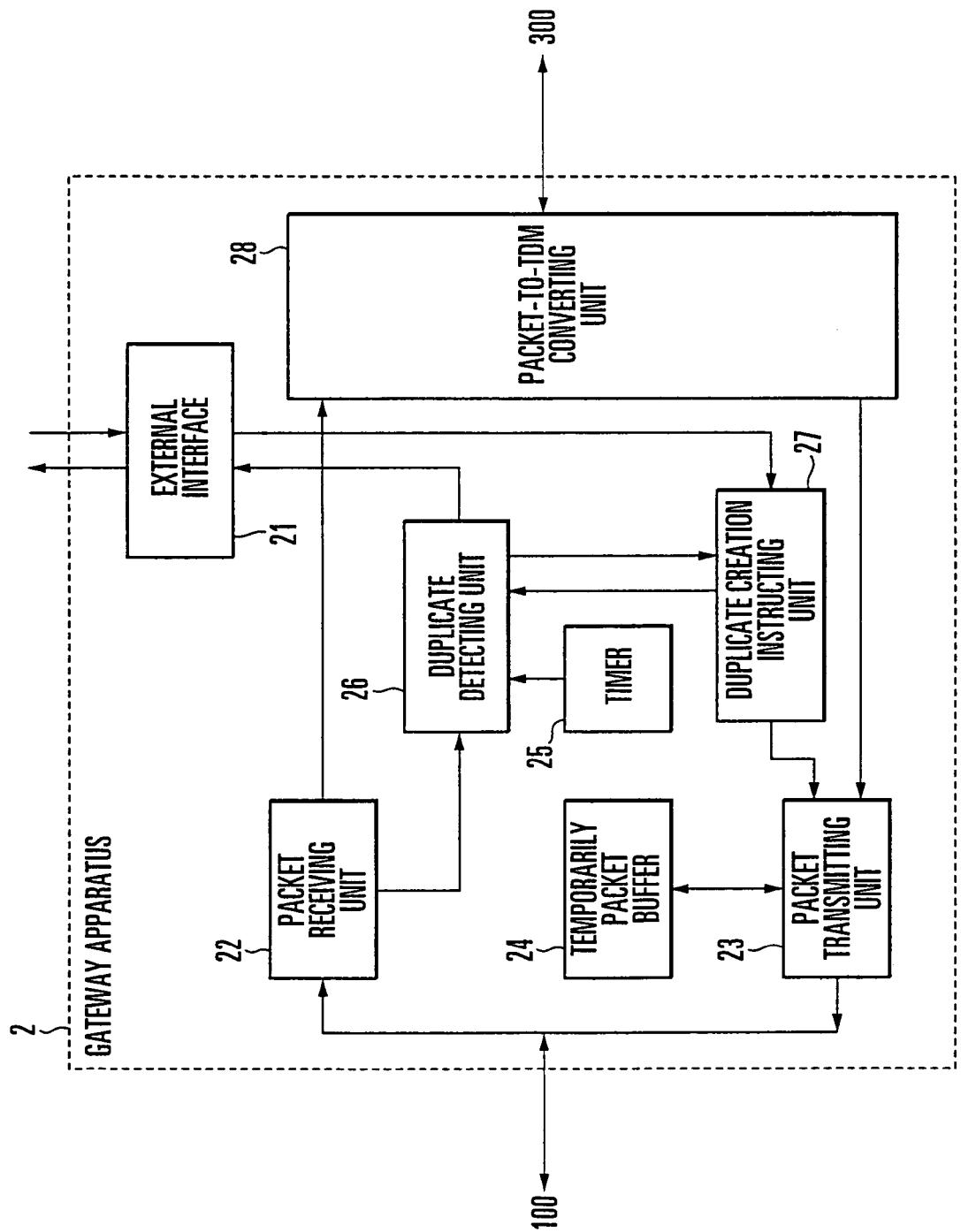
FIG. 3 is a block diagram showing an example of the configuration of the second gateway apparatus.

As shown in FIG. 3, the gateway apparatus 2 comprises a second external interface 21, second packet receiving unit 22, second packet transmitting unit 23, second temporary packet buffer (second packet holding unit) 24, second timer 25, second duplicate detecting unit 26, second duplicate creation instructing unit 27, and second packet-to-TDM converting unit 28.

The packet-to-TDM converting units 18 and 28 perform conversion of input TDM data into RTP (Real-time Transport Protocol) data and conversion of input RTP data into TDM data. RTP data created by the packet-to-TDM converting units 18 and 28 are output from the packet transmitting units 13 and 23 to the IP network 100 and the temporary packet buffers 14 and 24, respectively.

The temporarily packet buffers 14 and 24 temporarily hold the RTP data (RTP packets) input from the packet transmitting units 13 and 23. The RTP packets in the temporary packet buffers 14 and 24 are held until RTP packets each having a new sequence number are created, and the RTP packets are overwritten with the RTP packets each having the new sequence number. The RTP packets in the temporary packet buffers 14 and 24 are also sent to the IP network 100 via the packet transmitting units 13 and 23 immediately when the duplicate creation instructing units 17 and 27 instruct the packet transmitting units 13 and 23 on activation.

The duplicate creation instructing units 17 and 27 are activated upon externally receiving a measurement activation instruction via the external interfaces 11 and 21, and send an activation instruction to the packet transmitting units 13 and 23 and duplicate detecting units 16 and 26. The measurement activation instruction is an instruction to measure a delay in the IP network 100 between an apparatus (i.e., the gateway apparatus 1 or 2) and a counter apparatus (i.e., the gateway apparatus 2 or 1).

An RTP packet input from the IP network 100 is output to the packet-to-TDM converting units 18 and 28 via the packet receiving units 12 and 22. At this time, the packet receiving units 12 and 22 notify the duplicate detecting units 16 and 26 of the sequence number of the RTP packet.

When the duplicate creation instructing units 17 and 27 are activated, and when a packet having the same sequence number as that of an RTP packet which has already been received arrives at the packet receiving units 12 and 22 while the duplicate creation instructing units 17 and 27 are active, the duplicate detecting units 16 and 26 acquire the times of the timers 15 and 25, and notify the outside of the difference between the two times of each timer via the external interfaces 11 and 21. When the duplicate creation instructing units 17 and 27 are inactive, the duplicate detecting units 16 and 26 do not acquire any time from the timers 15 and 25, and instruct the duplicate creation instructing units 17 and 27 to create duplicate packets.

Figure 4:
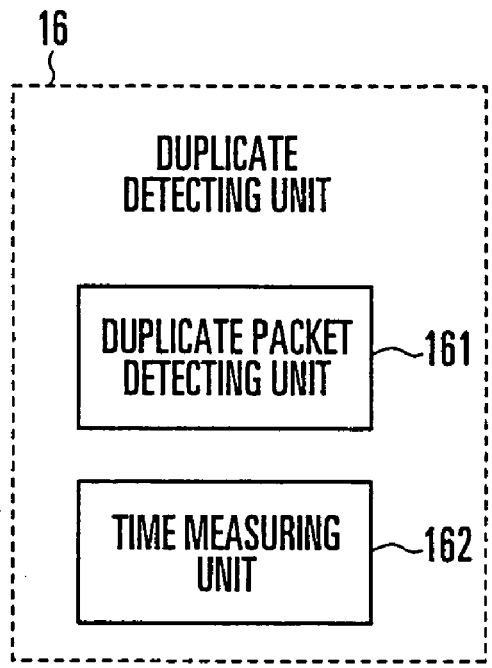
FIG. 4 is a block diagram showing the configuration of a duplicate detecting unit in the first gateway apparatus.
Figure 5:
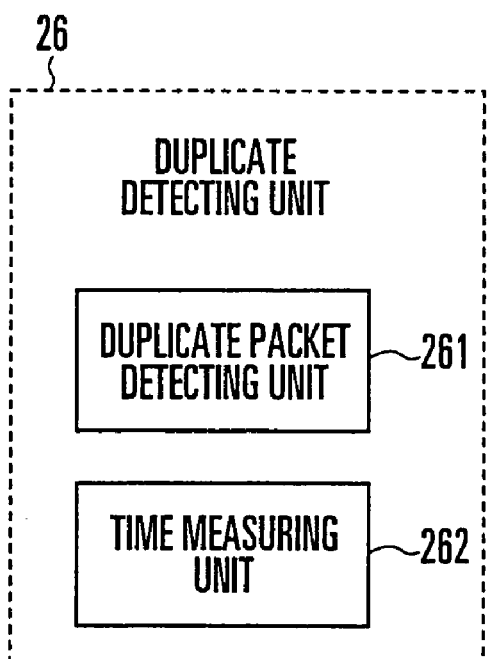
FIG. 5 is a block diagram showing the configuration of a duplicate detecting unit in the second gateway apparatus.
Figures 6A, 6B:
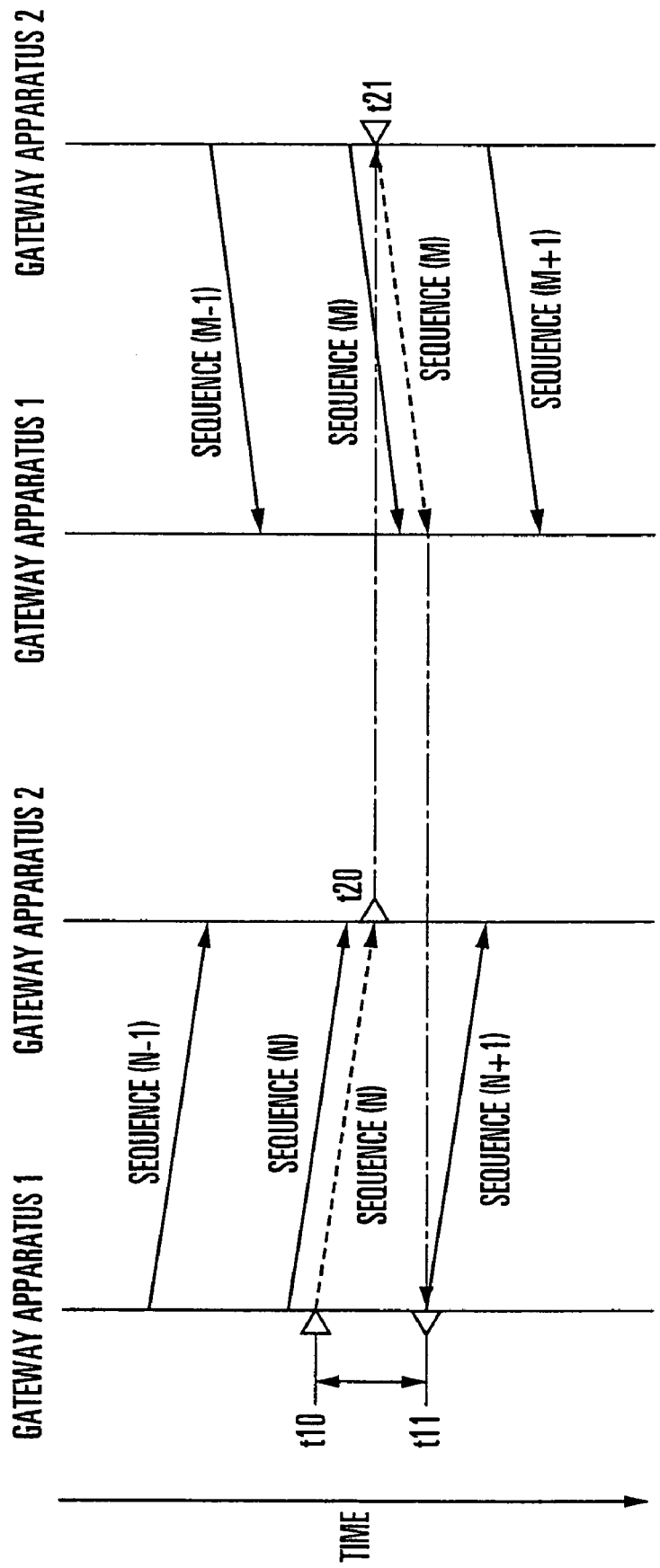
FIG. 6A is a timing chart showing transmission/reception of an RTP packet from the first gateway apparatus to the second gateway apparatus.
FIG. 6B is a timing chart showing transmission/reception of an RTP packet from the second gateway apparatus to the first gateway apparatus.

For example, as shown in FIG. 4, the duplicate detecting unit 16 is formed from a first duplicate packet detecting unit 161 and first time measuring unit 162. For example, as shown in FIG. 5, the duplicate detecting unit 26 is formed from a second duplicate packet detecting unit 261 and second time measuring unit 262. The duplicate packet detecting units 161 and 261 detect, from packets which arrive at the packet receiving units 12 and 22, packets having the same sequence numbers as those of RTP packets which have already been received. The time measuring units 162 and 262 acquire the times of the timers 15 and 25 at the above-mentioned two timings, and measure the difference between the times of each timer.

A delay measurement method in the communication system according to the embodiment of the present invention will be explained with reference to FIGS. 6A, 6B, 7, and 8.

The embodiment is directed to an operation when an RTP stream exists between the gateway apparatuses 1 and 2, the gateway apparatus 1 is instructed at the time t10 to measure a round-trip delay value in the gateway apparatus 1—the gateway apparatus 2—the gateway apparatus 1. Measurement of the round-trip delay value is to measure a round-trip time until a packet originated from a given terminal arrives at another terminal and a response to the packet is sent back. As the measurement method, for example, a ping command is available.

Figure 7:
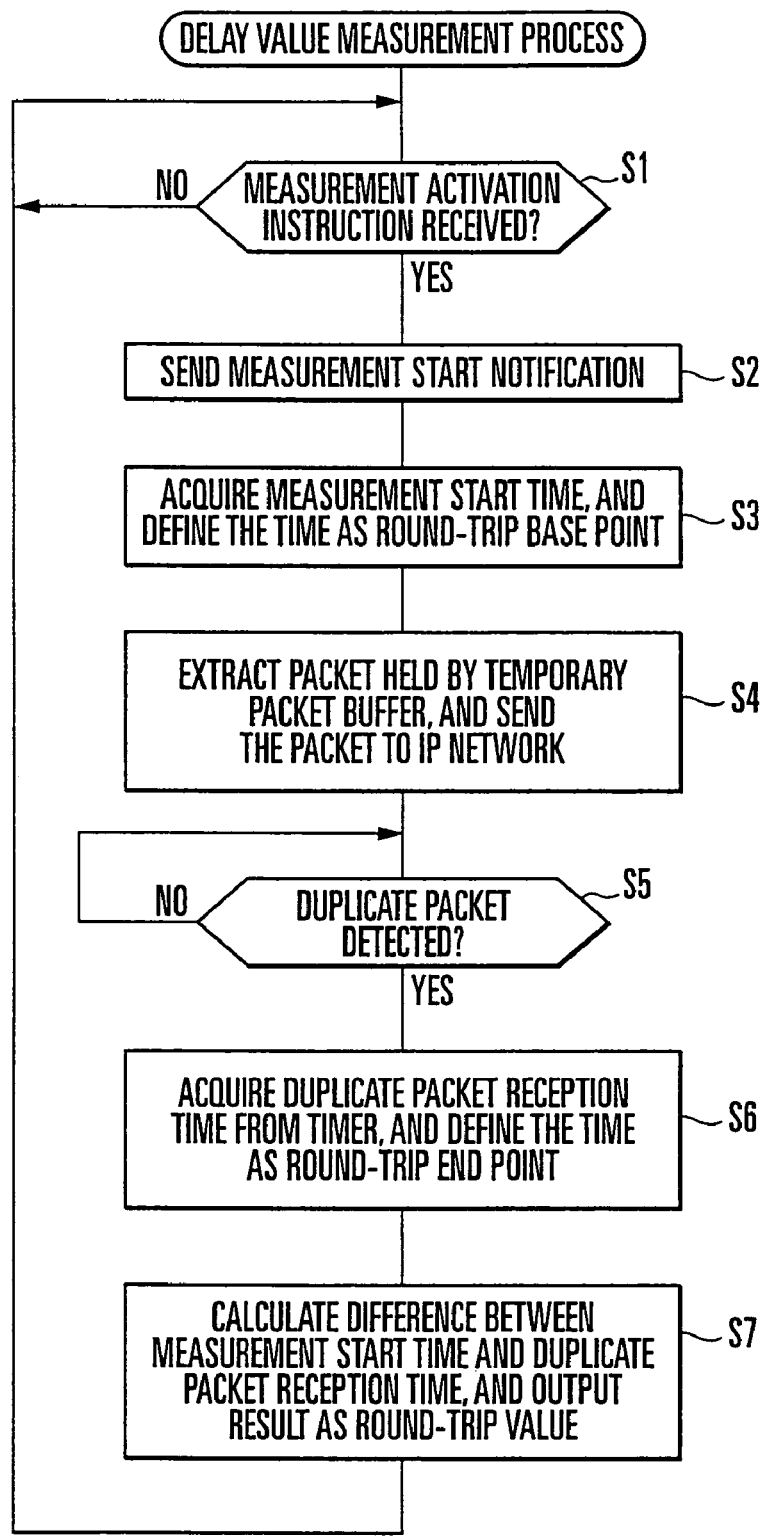
FIG. 7 is a flowchart showing operation of the first gateway apparatus.

If the gateway apparatus 1 receives a measurement activation instruction via the external interface 11 (step S1 in FIG. 7), the duplicate creation instructing unit 17 notifies the duplicate detecting unit 16 and packet transmitting unit 13 of the start of measurement (step S2 in FIG. 7). The time measuring unit 162 of the duplicate detecting unit 16 acquires the measurement start time t10 from the timer 15, and defines the time t10 as a round-trip base point (step S3 in FIG. 7).

The packet transmitting unit 13 extracts from the temporarily packet buffer 14 a copy of a packet that has been sent finally to a route passing through the gateway apparatus 2 and has a sequence number N. The packet transmitting unit 13 immediately sends the copy as the first packet to the IP network 100 without changing data, the header, or the like (step S4 in FIG. 7). As a result, the first packet which coincides with a packet sent immediately before the gateway apparatus 1 receives the measurement activation instruction is sent to the counter gateway apparatus 2.

In the gateway apparatus 2, the first packet which has arrived at the time t20 and has the sequence number N is sent to the duplicate detecting unit 26 via the packet receiving unit 22, and the duplicate packet detecting unit 261 of the duplicate detecting unit 26 detects that the first packet is a duplicate packet (steps S11 and S12 in FIG. 8). As the duplicate packet detection method, for example, rejuvenation of the sequence number is detected, or the sequence numbers of several past packets are held and compared. If no duplicate packet is detected, the gateway apparatus 2 executes a normal packet reception process (step S13 in FIG. 8).

Since the duplicate creation instructing unit 27 is inactive at this time, the duplicate detecting unit 26 activates the duplicate creation instructing unit 27, which instructs the packet transmitting unit 23 to create a duplicate packet (step S14 in FIG. 8). If the packet transmitting unit 23 is instructed to create a duplicate packet, it extracts from the temporary packet buffer 24 a copy of a packet that has been sent finally to a route passing through the gateway apparatus 1 and has a sequence number M. The packet transmitting unit 23 immediately sends the copy as the second packet to the IP network 100 at the time t21 without changing data, the header, or the like (step S15 in FIG. 8). Consequently, the second packet which coincides with a packet sent immediately before the gateway apparatus 2 detects the first packet is sent to the gateway apparatus 1.

In the gateway apparatus 1, the second packet which has arrived at the time t11 and has the sequence number M is sent to the duplicate detecting unit 16 via the packet receiving unit 12, and the duplicate packet detecting unit 161 of the duplicate detecting unit 16 detects that the second packet is a duplicate packet (step S5 in FIG. 7). Since the duplicate creation instructing unit 17 is active at this time, the time measuring unit 162 of the duplicate detecting unit 16 acquires the duplicate packet reception time t11 from the timer 15, and defines the time t11 as a round-trip end point (step S6 in FIG. 7). Further, the time measuring unit 162 calculates the difference (t11−t10) between the measurement start time t10 and the duplicate packet reception time t11. Accordingly, the time until the second packet is detected after the first packet is transmitted is measured in the gateway apparatus 1. The duplicate detecting unit 16 outputs the measurement result as a round-trip value via the external interface 11 (step S7 in FIG. 7).

As described above, according to the embodiment, the round-trip delay value of a route through which a sequence of data (RTP stream) transmitted using RTP pass can be measured in the IP network without using any special packet other than RTP. More specifically, in the embodiment, a transmitting (measuring) apparatus sends a duplicate packet of an RTP packet which has been sent immediately before a measurement instruction is received. A receiving apparatus detects the duplicate packet, and similarly sends a duplicate packet of an RTP packet which has been sent immediately before the duplicate packet is received. The transmitting apparatus measures the time until the duplicate packet from the receiving apparatus is detected, and thereby measures a round-trip delay value.

In this manner, in the embodiment, only an RTP packet is employed as a unique measurement packet, and any special packet (e.g., RTCP (RTP Control Protocol) ICMP (Internet Control Message Protocol), or alternation of RTP or the like) need not be used.

In the embodiment, duplication of a standard RTP packet is used as a measurement trigger, and does not adversely affect an existing apparatus. Further in the embodiment, the same RTP packet as that which forms an RTP stream to be measured is used, and the round-trip delay value of an RTP stream can be measured regardless of the settings of the NAT (Network Address Translation), firewall, or router.

That is, since the embodiment adopts a standard RTP packet, the influence on an RTP stream to be measured can be minimized, and a round-trip delay value can be measured independently of RTCP.

In the embodiment, each of the gateway apparatuses 1 and 2 can execute both of the processes shown in FIGS. 7 and 8.

The embodiment has exemplified a communication system having the two gateway apparatuses 1 and 2. Delay measurement in an IP network can also be similarly performed in a communication system having three or more gateway apparatuses.

The functions of the gateway apparatuses 1 and 2 can be implemented in cooperation with the hardware resource of a computer or the like having a communication function, and software (program) installed in the computer or the like.

Figure 9:
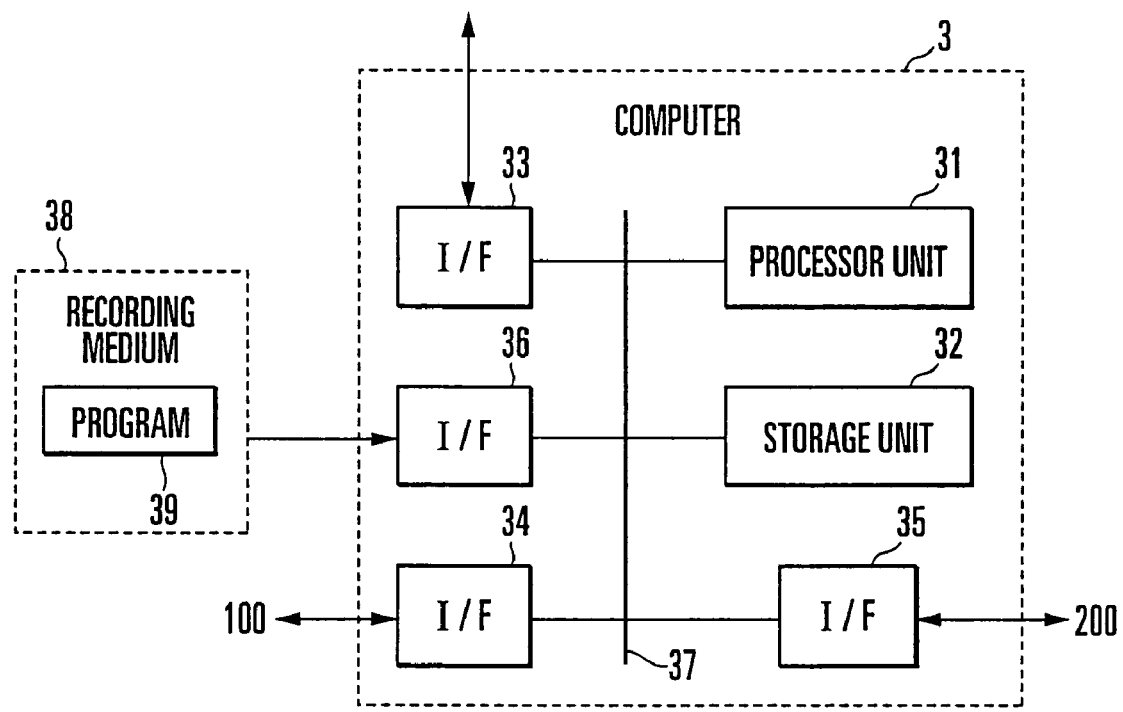
FIG. 9 is a block diagram showing another example of the configuration of the first gateway apparatus.

As shown in FIG. 9, a computer 3 which implements the functions of the gateway apparatus 1 is built by connecting a processor unit 31 (e.g., CPU), a storage unit 32 (e.g., ROM), and interfaces (I/Fs) 33 to 36 to each other via a bus 37. The I/F 33 transmits/receives a measurement activation instruction and round-trip delay value. The I/F 34 interfaces the IP network 100. The I/F 35 interfaces the TDM network 200. The I/F 36 interfaces a recording medium 38 such as a magnetic disk or optical disk.

A program 39 which controls the computer 3 can be provided by recording it on the recording medium 38. The program 39 recorded on the recording medium 38 is read out by the processor unit 31, and stored in the storage unit 32. When a measurement activation instruction is externally received, the processor unit 31 operates in accordance with the program 39 in the storage unit 32, thereby implementing the functions of the above-described gateway apparatus 1.

Although the gateway apparatus 1 has been exemplified, the functions of the gateway apparatus 2 can also be implemented by a similar computer and program.

What is claimed is:

1. A gateway apparatus comprising:
a packet transmitting unit which transmits to a counter apparatus a first packet that coincides with a packet transmitted immediately before reception of a delay measurement instruction for an IP (Internet Protocol) network between the gateway apparatus and the counter apparatus connected via the IP network;
a duplicate packet detecting unit which detects a second packet that is transmitted from the counter apparatus in response to reception of the first packet and coincides with a packet transmitted immediately before reception of the first packet; and
a time measuring unit which measures a time until said duplicate packet detecting unit detects the second packet after said packet transmitting unit transmits the first packet.

2. An apparatus according to claim 1, further comprising a packet holding unit which temporarily holds a packet transmitted from said packet transmitting unit,
wherein said packet transmitting unit extracts a packet held by said packet holding unit upon reception of the delay measurement instruction, and transmits the packet as the first packet.

3. An apparatus according to claim 1, wherein said counter apparatus comprises a second duplicate packet detecting unit for detecting the first packet transmitted to the counter apparatus, and a second packet transmitting unit for transmitting to the gateway apparatus the second packet which coincides with a packet transmitted immediately before the first packet is detected.

4. An apparatus according to claim 3, further comprising a duplicate creation instructing unit which is activated upon reception of the delay measurement instruction, and instructs said packet transmitting unit to transmit the first packet.

5. An apparatus according to claim 4, wherein said counter apparatus comprises a second duplicate creation instructing unit, and said second duplicate packet detecting unit activates said second duplicate creation instructing unit and causes said second duplicate creation instructing unit to instruct the second packet transmitting unit to transmit the second packet, wherein when said second duplicate creation instructing unit is active upon detection of a packet, causes said time measuring unit to measure a time.

6. An apparatus according to claim 1, wherein said time measuring unit measures a time to measure a round trip delay value of a route through which an RTP stream serving as a sequence of data transmitted using RTP (Real time Transport Protocol) passes.

7. An apparatus according to claim 6, wherein said time measuring unit measures a round trip delay value in the gateway apparatus—the counter apparatus—the gateway apparatus when the RTP stream exists between the gateway apparatus and the counter apparatus.

8. An apparatus according to claim 6, wherein the first packet and the second packet include an RTP packet.

9. A communication system comprising a first gateway apparatus and a second gateway apparatus which are connected to each other via an IP (Internet Protocol) network, said first gateway apparatus comprising;
 a first packet transmitting unit which transmits to said second gateway apparatus a first packet that coincides with a packet transmitted immediately before reception of a delay measurement instruction for the IP network between said first gateway apparatus and said second gateway apparatus;
 a first duplicate packet detecting unit which detects a second packet that is transmitted from said second gateway apparatus in response to reception of the first packet and coincides with a packet transmitted immediately before reception of the first packet; and
 a time measuring unit which measures a time until said first duplicate packet detecting unit detects the second packet after said first packet transmitting unit transmits the first packet.

10. A system according to claim 9, wherein said first gateway apparatus further comprises a first packet holding unit which temporarily holds a packet transmitted from said first packet transmitting unit, and
 said first packet transmitting unit extracts a packet held by said first packet holding unit upon reception of the delay measurement instruction, and transmits the packet as the first packet.

11. A system according to claim 9, wherein said second gateway apparatus comprises
 a second duplicate packet detecting unit which detects the first packet from said first gateway apparatus, and
 a second packet transmitting unit which transmits to said first gateway apparatus the second packet that coincides with a packet transmitted immediately before the first packet is detected.

12. A system according to claim 11, wherein said second gateway apparatus comprises a second packet holding unit which temporarily holds a packet transmitted from said second packet transmitting unit, and
 said second packet transmitting unit extracts a packet which is held by said second packet holding unit upon detection of the first packet, and transmits the packet as the second packet.

13. A system according to claim 9, wherein said time measuring unit measures a time to measure a round trip delay value of a route through which an RTP stream serving as a sequence of data transmitted using RTP (Real time Transport Protocol) passes.

14. A system according to claim 13, wherein said time measuring unit measures a round trip delay value in said first gateway apparatus—said second gate apparatus—said first gateway apparatus when the RIP stream exists between said first gateway apparatus and said second gateway apparatus.

15. A system according to claim 13, wherein the first packet and the second packet include an RTP packet.

16. A delay measurement method comprising the steps of:
 causing a first gateway apparatus to transmit to a second gateway apparatus a first packet that coincides with a packet transmitted immediately before reception of a delay measurement instruction for an IP (Internet Protocol) network between the first gateway apparatus and the second gateway apparatus;
 causing the second gateway apparatus to detect a first packet from the first gateway apparatus;
 causing the second gateway apparatus to transmit to the first gateway apparatus a second packet that coincides with a packet transmitted immediately before the first packet is detected;
 causing the first gateway apparatus to detect the second packet from the second gateway apparatus; and
 causing the first gateway apparatus to measure a time until the second packet is detected after the first packet is transmitted.

17. A method according to claim 16, further comprising the step of causing the first gateway apparatus and the second gateway apparatus to temporarily hold transmitted packets,
 wherein in the step of transmitting the first packet, a packet held upon reception of the delay measurement instruction is transmitted as the first packet, and
 in the step of transmitting the second packet, a packet held upon detection of the first packet is transmitted as the second packet.

18. A method according to claim 16, wherein in the measurement step, a time is measured to measure a round trip delay value of a route through which an RTP stream serving as a sequence of data transmitted using RTP (Real time Transport Protocol) passes.

19. A method according to claim 18, wherein in the measurement step, a round trip delay value in the first gateway apparatus—the second gateway apparatus—the first gateway apparatus is measured when the RTP stream exists between the first gateway apparatus and the second gateway apparatus.

20. A method according to claim 18, wherein in the steps of transmitting the first packet and the second packet, the first packet and the second packet include an RTP packet.

21. A recording medium which records a program for causing a computer that forms a gateway apparatus connected to a counter apparatus via an IP (Internet Protocol) network to execute
 a process of transmitting to the counter apparatus a first packet that coincides with a packet transmitted immediately before reception of a delay measurement instruction for the IP network between the gateway apparatus and the counter apparatus;
 a process of detecting a second packet that is transmitted from the counter apparatus in response to reception of the first packet and coincides with a packet transmitted immediately before reception of the first packet; and
 a process of measuring a time until the second packet is detected after the first packet is transmitted.

\* \* \* \* \*